United States Patent [19]

Günesin et al.

[11] 4,363,897

[45] Dec. 14, 1982

[54] THERMALLY REVERSIBLE COPOLYMERS AND PROCESS FOR THE PREPARATION THEREOF

[75] Inventors: Binnur Günesin, Uniontown; Gary R. Hamed, Akron; Jung W. Kang, Clinton; Donald N. Schulz, Hartville, all of Ohio

[73] Assignee: The Firestone Tire & Rubber Company, Akron, Ohio

[21] Appl. No.: 303,213

[22] Filed: Sep. 18, 1981

Related U.S. Application Data

[62] Division of Ser. No. 132,737, Mar. 24, 1980, Pat. No. 4,307,210.

[51] Int. Cl.³ .............................................. C08F 222/38
[52] U.S. Cl. ..................................... 525/195; 525/218
[58] Field of Search ................................ 525/195, 218

[56] References Cited

U.S. PATENT DOCUMENTS

| | | | |
|---|---|---|---|
| 3,037,963 | 6/1962 | Christenson | 260/72 |
| 3,070,434 | 2/1963 | Christenson et al. | 260/561 |
| 3,118,852 | 1/1964 | Christenson et al. | 260/45.2 |
| 3,247,139 | 4/1966 | Christenson et al. | 260/21 |
| 3,320,204 | 5/1967 | Blanchard et al. | 525/369 |
| 3,404,134 | 10/1968 | Rees | 525/369 |
| 3,429,952 | 2/1969 | Nordsick et al. | 525/369 |
| 3,493,550 | 2/1970 | Schmitt et al. | 525/369 |
| 3,649,578 | 3/1972 | Bush et al. | 525/369 |
| 3,804,923 | 4/1974 | Suzuki et al. | 525/369 |
| 3,808,168 | 4/1974 | Young et al. | 260/33.4 R |
| 3,832,317 | 8/1974 | Mikofalvy et al. | 260/29.6 R B |
| 3,950,313 | 4/1976 | Bain et al. | 260/79.5 C |
| 4,205,150 | 5/1980 | Marubashi | 525/369 |

FOREIGN PATENT DOCUMENTS 851045  12/1960  United Kingdom ............... 525/369

Primary Examiner—William F. Hamrock

[57] ABSTRACT

The invention disclosed herein provides a novel thermally reversible copolymer having up to about 11 percent by weight of an N-(alkoxymethyl)acrylamide, a diene-containing synthetic rubber and a metal. The thermally reversible copolymer can be blended with conventional styrene-butadiene rubbers to improve the green strength thereof. Also disclosed herein is a process for improving the green strength of styrene-butadiene rubber which includes the steps of charging a reaction vessel with water, an emulsifier, an initiator, an N-(alkoxymethyl)-acrylamide monomer and a vinyl monomer where one is desired, purging the vessel with an inert gas, charging a diene monomer and an activator to the reaction vessel, polymerizing the monomers to form a copolymer latex, coagulating the latex with an aqueous metal salt to form a thermally reversible polymer and compounding the thermally reversible polymer with styrene-butadiene rubber.

3 Claims, 8 Drawing Figures

000
THERMALLY REVERSIBLE COPOLYMERS AND PROCESS FOR THE PREPARATION THEREOF

CROSS-REFERENCE TO RELATED APPLICATION

This application is a division of U.S. Ser. No. 132,737, filed Mar. 24, 1980 now U.S. Pat. No. 4,307,210.

TECHNICAL FIELD

The present invention is directed toward polymer compositions comprising copolymers of N-(alkoxymethyl)-acrylamides, dienes or diene-containing rubbers and metal salts. The amide-metal polymer compositions are cross-linked via metal ions and are thermally reversible in solution or bulk. Such copolymers exhibit improved green strength and can additionally be blended with synthetic rubber to improve green strength. When blended with natural rubber, equivalent amounts of the latter are saved without sacrifice of the green strength thereof.

An important requirement for a tire body ply is that it have good green strength in order to prevent tearing or excessive sagging during the building operation as well as subsequent conveying and/or storing of the green tire. Additionally, high green strength will help to prevent cord movement during tire molding. Normal emulsion SBR containing 23% by weight bound styrene has poor green strength. Upon stretching, the material necks down rapidly and shows no strain hardening. By comparison, natural rubber strain crystallizes giving it excellent green strength. Improving the green strength of SBR rubber without adversely affecting its processability can be achieved by practice of the present invention.

BACKGROUND ART

Resinous materials of N-(isobutoxymethyl)acrylamide, styrene-butadiene or styrene-isoprene and an aldehyde are disclosed in U.S. Pat. Nos. 3,037,963 and 3,079,434 and can be utilized to form coating films having good flexibility, recoat adhesion and resistance to marring, staining, heat, detergents and corrosion. Neither patent discloses the coagulation of a polymer latex comprising these ingredients with metal salts nor any suggestion by which the green strength of synthetic rubber such as SBR could be improved.

U.S. Pat. No. 3,950,313 discloses polymer compositions having thermally reversible cross-links which can comprise an elastomeric interpolymer of vinylpyridine, styrene and butadiene, cross-linked with a metal from an organometallic compound which can be incorporated into the polymer by mixing. This patent, as the preceding two, is silent regarding the coagulation of a polymer latex with a metal salt and improving the green strength of SBR.

U.S. Pat. No. 3,808,168 discloses thermosetting coating compositions comprising resins which cure on baking via the condensation reaction of an N-methylol group, and ethers thereof, with volatile alcohols which resins are catalyzed to cure more rapidly or at lower temperatures by incorporating up to about 3% by weight, per weight of the resin, a dissolved inorganic metal salt wherein the metals include those in Groups I and II and the transition metals and the anions are halides, nitrates, phosphates, oxychlorides, fluoborates, fluosilicates or sulfates. The invention is illustrated with a methylolated acrylamide interpolymer in an organic solvent solution particularly one containing butanol and 2-butoxy ethanol and which forms an enamel paint with addition of a suitable pigment. There is no suggestion that the methylolated acrylamide interpolymer could be utilized to form a copolymer with styrene-butadiene and, in turn, cross-linked through certain metal ions to improve green strength.

Thus, coagulation of a polymer latex comprising an N-(alkoxymethyl)acrylamide and a diene or diene-containing synthetic rubber with metal ions has not been disclosed in the patents of which we are aware.

DISCLOSURE OF INVENTION

It is therefore an object of the present invention to provide a thermally reversible copolymer comprising an N-(alkoxymethyl)acrylamide and a diene cross-linked by metal ions.

It is another object of the present invention to provide a thermally reversible copolymer comprising an N-(alkoxymethyl)acrylamide and a diene-containing synthetic rubber such as SBR or nitrile rubber and mixtures thereof, cross-linked by metal ions.

It is yet another object of the present invention to provide an N-(alkoxymethyl)acrylamide-metal polymer composition that can be incorporated into synthetic rubber such as SBR to improve the green strength thereof.

It is a further object of the present invention to provide a process for the preparation of thermally reversible copolymers comprising an N-(alkoxymethyl)acrylamide and a diene or diene-containing synthetic rubber and metal ions by preparing a polymer latex and coagulating it with a metal salt.

These and other objects, together with the advantages thereof over any known N-(alkoxymethyl)acrylamide-metal polymer compositions, which shall become apparent from the specification which follows, are accomplished by the invention as hereinafter described and claimed.

In general, the thermally reversible copolymer of the present invention comprises from about 0.5 to about 11 percent by weight of an N-(alkoxymethyl)acrylamide, sometimes generally referred to hereinafter as an acrylamide, from about 10 to about 90 percent by weight of a diene compound, from about 0 to about 90 percent by weight of a monomer containing a vinyl group and, a metal. The thermally reversible copolymer can be blended with conventional styrene-butadiene rubbers to improve the green strength thereof. Alternatively, it can be blended with natural rubber without deleteriously affecting the green strength of the latter.

The present invention also includes a process for improving the green strength of styrene-butadiene rubbers which includes the steps of charging a reaction vessel with water, an emulsifier, an initiator, an N-(alkoxymethyl)-acrylamide monomer and a vinyl monomer where one is desired, purging the vessel with an inert gas, charging a diene monomer and an activator to the reaction vessel, polymerizing the monomers to form a copolymer latex, coagulating the latex with an aqueous metal salt to form a thermally reversible polymer and compounding the thermally reversible polymer with styrene-butadiene rubber.

PREFERRED MODE FOR CARRYING OUT THE INVENTION

Figure 1:
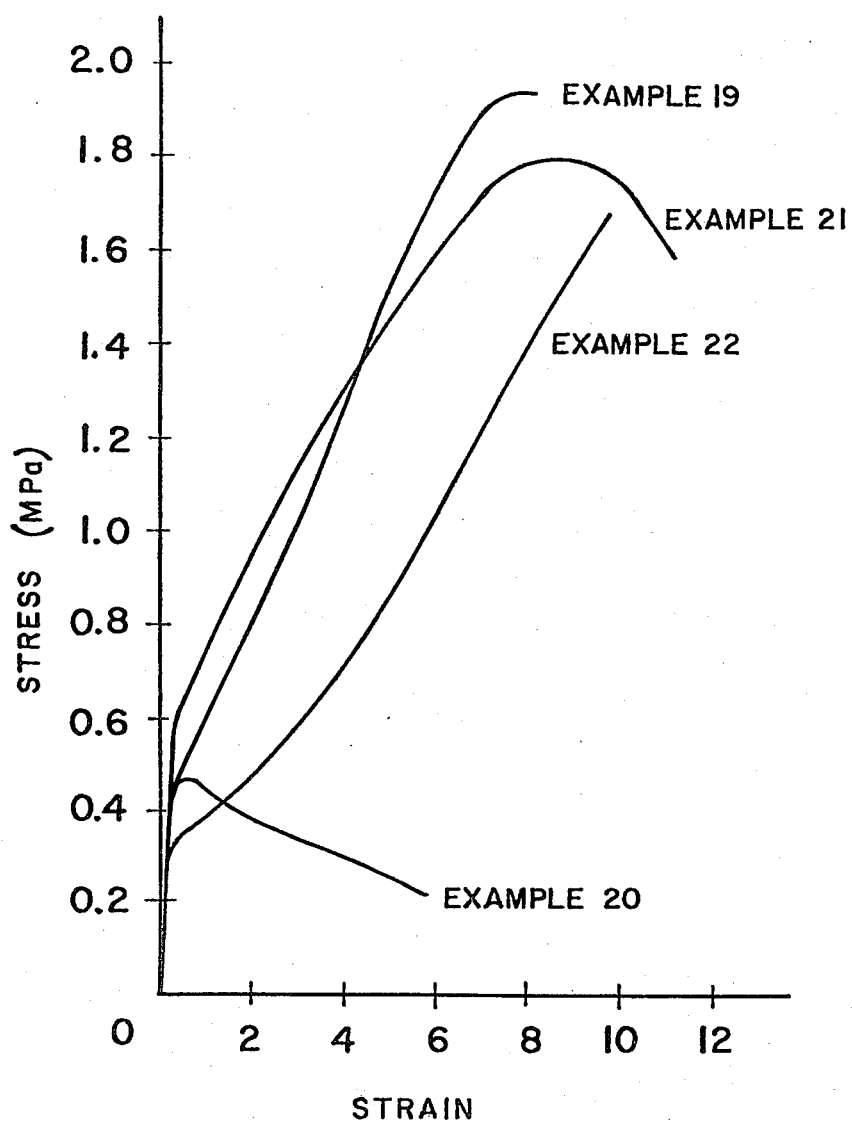
FIGS. 1–6 present various stress-strain curves for copolymers of the present invention compounded with a conventional SBR and, for comparison, a conventional high green strength SBR and a natural rubber, all of which shall be explained in greater detail hereinbelow.

The polymer composition of the present invention comprises a copolymer of an N-(alkoxymethyl)acrylamide, a diene and optionally a monomer containing a vinyl group. Suitable acrylamides having the formula

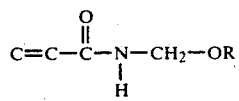

can be employed wherein R is a straight or branched alkyl chain having from 1 to about 20 carbon atoms with 3 to 8 carbon atom chains being preferred. One particularly useful acrylamide we have employed for the work reported herein is N-(isobutoxymethyl)acrylamide, hereinafter abbreviated IBMA, the R group being isobutyl.

With respect to the other monomers, those that are polymerizable in emulsion systems can be employed. Generally, diene monomers having from about four to 20 carbon atoms could be employed with butadiene or isoprene being preferred. Additionally, halogenated or other substituted emulsion polymerizable monomers could be employed. Monomers containing vinyl groups that can be employed include monovinyl aromatic compounds having from eight to about 20 carbon atoms and vinyl compounds having three to about five carbon atoms and a nitrile group. Examples of the first type would include styrene and alpha-methylstyrene as well as other alkyl substituted or halogenated emulsion polymerizable monomers. In a preferred embodiment, butadiene and styrene will be selected to form the styrene-butadiene copolymer, SBR, which is, in turn, copolymerized with IBMA and subsequently cross-linked with metal ions. Examples of the second type of vinyl compound would be acrylonitrile and methyl methacrylate. Butadiene and acrylonitrile can be employed to form a copolymer, nitrile rubber which is, in turn, copolymerized with IBMA or other acrylamide and cross-linked with metal ions.

Regarding composition of the copolymer, the amount of acrylamide employed can range from about 0.5 to about 11 percent by weight with about 0.5 to 6 percent being preferred; the amount of diene can range from about 10 to about 90 percent by weight with about 70 to 80 percent being preferred and, the amount of the monomer containing a vinyl group can range from about 0 to about 90 percent by weight with about 20 to 30 percent being preferred. The vinyl monomer can be absent, wherein the copolymer of diene and acrylamide is formed, or it can be a monovinyl aromatic such as styrene or it can be the nitrile species as well as mixtures of the two. Number average molecular weight of the copolymers of the present invention can range from about 5,000 to about 500,000. Preferred number average molecular weights of the diene-vinyl-acrylamide copolymer can range from about 80,000 to about 150,000 while for the diene-acrylamide copolymer the range is from about 70,000 to about 250,000.

The metal ions that coagulate the polymer latex are all divalent, trivalent and polyvalent metal ions such as aluminum, barium, cadmium, calcium, chromium, cobalt, iron, magnesium, manganese, nickel, tin, zinc and the like which are supplied as metal salts having the formula $MX_n$ wherein M is one of the foregoing elements, X is an anion such as an organic carboxylate, halide, hydroxide, nitrate, sulfate, sulfonate and the like and n is from two to six. The amount of the metal salt employed is that amount which will provide at least one equivalent mole of the metal ion to two equivalent moles of IBMA bonded to the polymer latex in the final product.

Preparation of the copolymer is via emulsion polymerization in water and an emulsifier such as sodium lauryl sulfate. A water soluble initiator is employed such as diisopropylbenzene hydroperoxide and, a molecular weight modifier, n-dodecyl mercaptan, can be added. An activator such as tetraethylenepentamine is added to the reaction vessel immediately after the diene monomer is charged.

Other emulsifiers suitable for the present invention include long chain metal sulfonates and rosin acid salts. Amounts added range from about two parts per hundred of monomer (phm) to about five phm. Initiators suitable for the present invention other than diisopropylbenzene hydroperoxide include other free radical types such as peroxides and peroxydicarbonates, benzoyl peroxide, cumene hydroperoxide and tert-butyl peroxide, and the amount employed ranges from about 0.1 phm to about 0.6 phm depending upon the desired molecular weight of the polymer product. Similarly, the activators can include $FeSO_4.7H_2O$, alkyl amines having primary and secondary amines and sodium formaldehyde sulfoxylate in an amount of from about 0.1 phm to 0.6 phm. Other molecular weight modifiers suitable for this invention include tertiary alkyl mercaptans which are employed in amounts of from about 0.1 phm to about 0.3 phm. Antioxidants can also be employed such as di-tert-butyl-para-cresol (DBPC) and Santoflex which are added to the polymer latex in amounts of from about 0.1 to about 1.0 percent by weight of the solid polymer.

Synthesis generally involves the steps of charging a reaction vessel with the water, detergent, a modifier if desired, the initiator, and the acrylamide and vinyl monomers; purging the vessel with an inert gas such as nitrogen; charging the diene monomer and activator to the vessel and polymerizing the monomers therein for a period of time of from about 12 to about 16 hours at a temperature of from about 0° C. to about 30° C. Following polymerization, the polymer latex is coagulated by the addition of an aqueous metal salt and, if desired, an antioxidant. The coagulum can be washed with water and dried and thereafter blended with an SBR or natural rubber.

Styrene-butadiene rubber that can be strengthened with the copolymer of the present invention can have a styrene content of from about 5 to 30 percent by weight, a corresponding butadiene content of from about 95 to 70 percent by weight and a number average molecular weight of from about 5,000 to 500,000. The amount of the acrylamide copolymers of the present invention that should be added to the SBR to improve the green strength is at least 50 parts by weight based upon 100 parts of the rubber (phr). Generally, the same amount is necessary whether the copolymer contains a vinyl component or not.

A typical synthesis of the acrylamide copolymer of the present invention was conducted as follows: A 295 ml bottle was charged with 100.00 g of water, 2.50 g of sodium lauryl sulfate, 0.20 g of diisopropylbenzene hydroperoxide, 0.05 g of n-dodecyl mercaptan, 10.00 g of styrene and 2.00 g of N-(isobutoxymethyl)acrylamide. The bottle was sealed with a rubber lined, three-hole crown cap and was purged with nitrogen for 15 minutes. 36.00 g of butadiene was charged followed by 0.15 g of tetraethylenepentamine. The polymerization was conducted at 5° C. for 13 hours. At the end of this time, a 60% conversion of polymer latex was obtained from the bottle after evaporation of volatiles. The latex was then coagulated in the presence of an aqueous solution of calcium chloride and DBPC. The coagulum was collected, broken into small pieces, washed with hot water and dried under vacuum at 60° C. overnight.

Table I reports the content and molecular weight of six acrylamide copolymers comprising IBMA and SBR, prepared according to the foregoing synthesis. The amount of IBMA in the product varied between 0.67 and 5.99 weight percent and each of the latexes was modified with an aqueous solution of $CaCl_2$. The concentration of the solution was 0.2 grams of salt in 100 milliliters of water.

Modification of 12 additional samples of IBMA-SBR copolymers with four different divalent metal salts was conducted and is reported in Table II which also indicates the initial charge of the aqueous salt solution, the metal content in the polymer product and the ratio of IBMA to metal.

TABLE I

| IBMA—SBR—Calcium Chloride Modified Copolymers | | | | | |
|---|---|---|---|---|---|
| Example No. | Elemental IBMA (wt %) | Analysis Ca (wt %) | Styrene[a] (wt %) | Butadiene[a] (wt %) | IBMA[a] (wt %) | $\overline{M}$ |
| 1 | 0.67 | 0.43 | 23.9 | 75.4 | 0.72 | 113,000 |
| 2 | 1.28 | 0.78 | 24.3 | 74.5 | 1.31 | 114,000 |
| 3 | 1.57 | 0.47 | 23.1 | 75.3 | 1.60 | 88,000 |
| 4 | 2.02 | 0.45 | 25.2 | 72.5 | 2.30 | 74,000 |
| 5 | 3.70 | 1.04 | 22.3 | 73.8 | 3.92 | 89,000 |
| 6 | 5.99 | 1.05 | 21.3 | 72.5 | 6.20 | 110,000 |

[a] Determined by $H^1$ NMR spectroscopy

TABLE II

| IBMA—SBR—$MCl_2$ Modified Copolymers | | | | |
|---|---|---|---|---|
| Example No. | Initial Charge of $MCl_2$ (g) | Yield of Polymer (g) | Metal Content (wt %) | Ratio of IBMA/M |
| $CaCl_2$ | | | | |
| 7 | 0.200 | 8.5 | 0.31 | a |
| 8 | 0.400 | 11.8 | 0.32 | a |
| 9 | 0.500 | 11.5 | 0.35 | 1.20 |
| $ZnCl_2$ | | | | |
| 10 | 0.245 | 11.8 | 0.57 | a |
| 11 | 0.490 | 11.4 | 0.54 | a |
| 12 | 0.612 | 11.8 | 0.68 | 0.95 |
| $NiCl_2.6H_2O$ | | | | |
| 13 | 0.213 | 2.5 | 0.37 | a |
| 14 | 0.426 | 10.2 | 0.48 | a |
| 15 | 0.853 | 11.7 | 0.45 | 1.30 |
| $MgCl_2.6H_2O$ | | | | |
| 16 | 0.183 | 4.0 | 0.044 | a |
| 17 | 0.365 | 12.2 | 0.12 | a |
| 18 | 0.730 | 11.2 | 0.12 | 2.00 |

[a] Not calculated

Having successfully prepared IBMA-SBR copolymers containing from 0.67 weight percent to about 5.99 weight percent IBMA content, cross-linked with various metals we next compounded several of the products with a commercial emulsion SBR having a number average molecular weight of about 250,000, a styrene content of 25 weight percent and a butadiene content of 75 weight percent. The copolymers selected were each cross-linked with various aqueous metal salt solutions. The amounts of the metal-modified copolymer added to the conventional SBR were varied and are reported in Table III. In addition to the ingredients reported in Table III, each of the examples therein contained the following ingredients, amounts being given in parts per hundred rubber (phr):

HAF carbon black—30
FEF carbon black—20
ZnO—7.5
Stearic acid—3.4
Resin—5.2

Stress-strain behavior for the products reported in Table III was determined and plotted in the graphs depicted in FIGS. 1-6. For purposes of comparison, stress-strain behavior for natural rubber; one high green strength SBR compound and the commercial SBR described hereinabove were also determined and have been reported. It is to be understood that the formulations appearing herein have been selected as exemplary of the practice of the present invention and that we do not intend to exclude other formulations disclosed herein or suggested thereby which are not exemplified.

TABLE III

| Example No. | NR[a] | SBR | HGS[b] SBR | 3.6% IBMA | 6% IBMA | 1.57% IBMA | 0.67% IBMA | 3.6% IBMA | 0.67% IBMA | 1.57% IBMA | Oil | Santocure | Sulfur |
|---|---|---|---|---|---|---|---|---|---|---|---|---|---|
| 19 | — | — | — | — | 130 | — | — | — | — | — | — | 2.2 | 1.5 |
| 20[c] | — | 100 | — | — | — | — | — | — | — | — | 2.2 | 1.13 | 2.09 |
| 21 | — | — | 130 | — | — | — | — | — | — | — | — | 2.2 | 1.5 |
| 22 | 100 | — | — | — | — | — | — | — | — | — | — | 1.0 | 2.5 |
| 23 | — | 40 | — | — | — | 60 | — | — | — | — | — | 2.2 | 1.5 |
| 24 | — | 80 | — | — | — | — | 20 | — | — | — | — | 2.2 | 1.5 |
| 25 | — | 60 | — | — | — | — | 40 | — | — | — | — | 2.2 | 1.5 |
| 26 | — | 40 | — | — | — | — | 60 | — | — | — | — | 2.2 | 1.5 |
| 27 | — | 40 | — | — | — | — | — | 60 | — | — | — | 2.2 | 1.5 |
| 28 | — | 40 | — | — | — | — | — | — | 60 | — | — | 2.2 | 1.5 |

TABLE III-continued

| Example No. | NR[a] | SBR | HGS[b] SBR | 3.6% IBMA | 6% IBMA | 1.57% IBMA | 0.67% IBMA | 3.6% IBMA | 0.67% IBMA | 1.57% IBMA | Oil | Santocure | Sulfur |
|---|---|---|---|---|---|---|---|---|---|---|---|---|---|
| 29 | — | 40 | — | — | — | — | — | — | — | 60 | — | 2.2 | 1.5 |

[a] Natural rubber
[b] High green strength
[c] 8.2 parts of resin

With reference to the drawings, the stress-strain properties of each of the examples set forth in Table III will be discussed. These samples were tested in the green state on an Instron, strain rate of 20 min$^{-1}$.

FIG. 1 presents four curves for compounds comprising the commercial emulsion SBR, Example 20; natural rubber, Example 22; a high green strength SBR, Example 21; and an IBMA-SBR copolymer of the present invention containing six percent IBMA, Example 19. The conventional SBR compound is seen to exhibit poor strength (0.2 MPa at break) and elongation (600% at break) as well as a large region of negative slope in its stress-strain response. The remaining three curves have extensive regions in which their slope is positive indicating that there exists some type of reinforcement. The peak stress for the IBMA-SBR product of the present invention (Example 19) occurred at break and was 1.95 MPa. Elongation at break was 840%.

Figure 2:
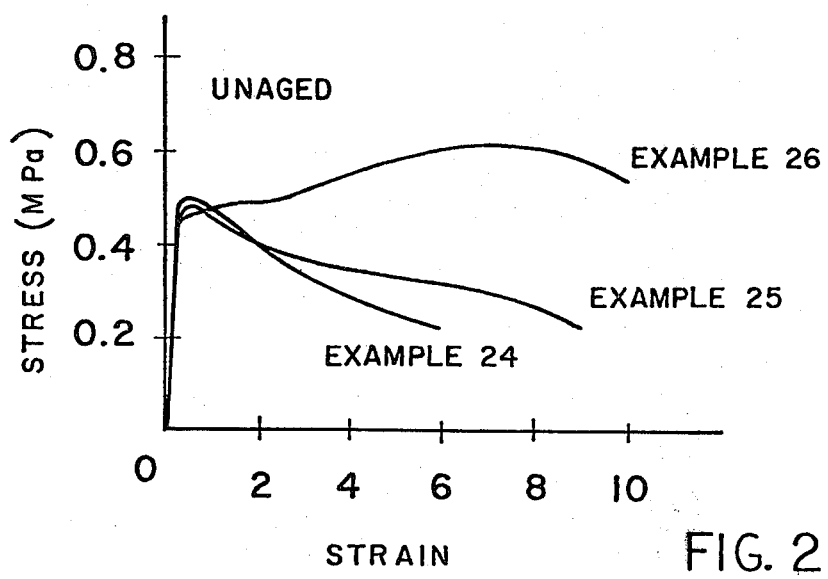
Figure 3:
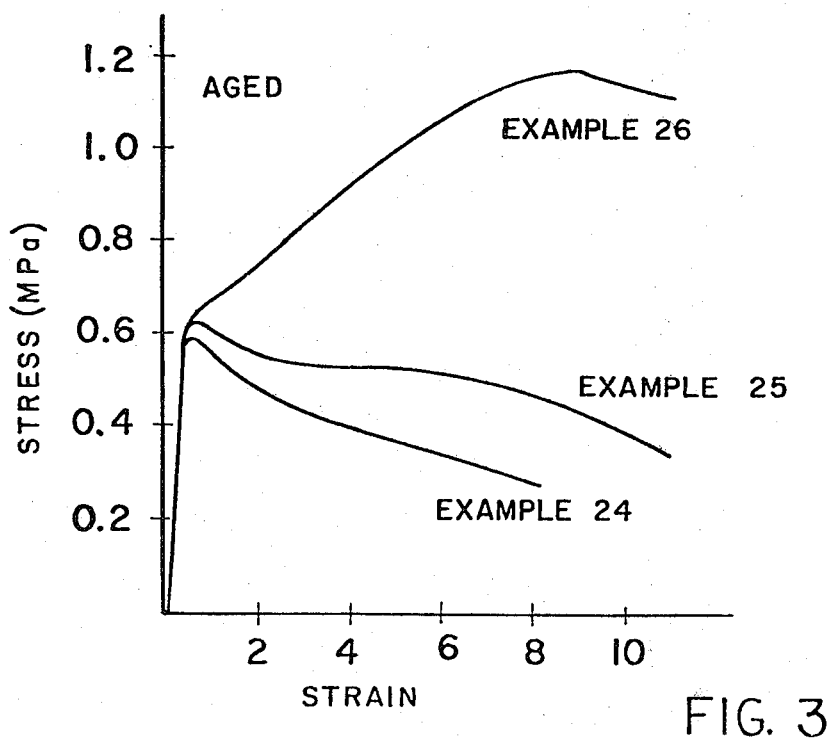

FIGS. 2 and 3 depict green stress-strain curves for an IBMA-SBR copolymer of the present invention, having 0.67% IBMA, blended with a conventional SBR. Even at the low functionality level, it can be seen that there is strain hardening in the upper curve (Example 26) when the IBMA-SBR content is greater than 50%. FIG. 3 presents curves for the identical composition after aging for several days following mixing and pressing. An increase in green strength for all three compositions is observed.

Figure 4:
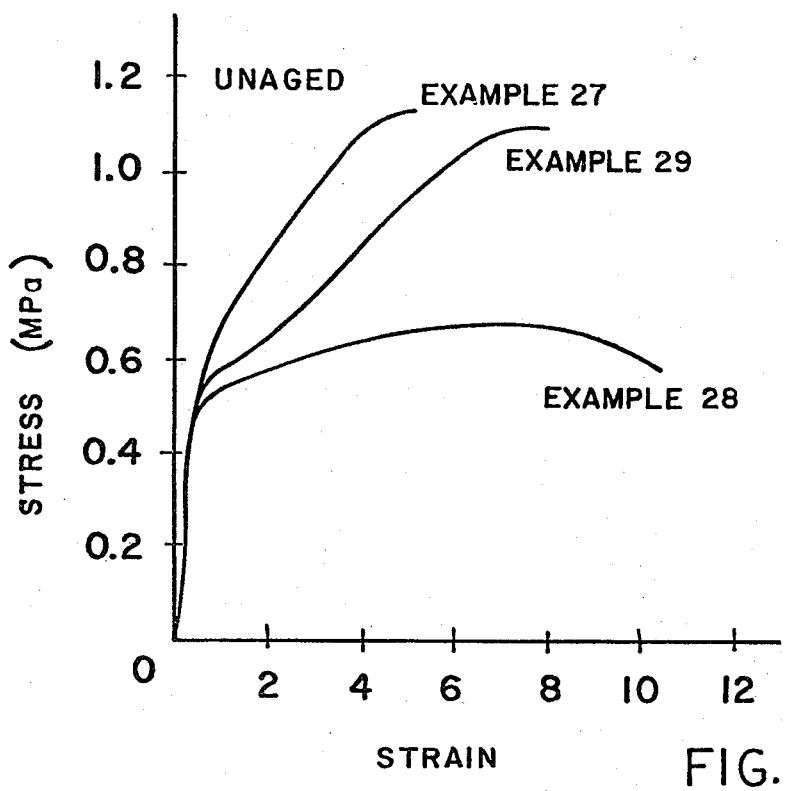
Figure 5:
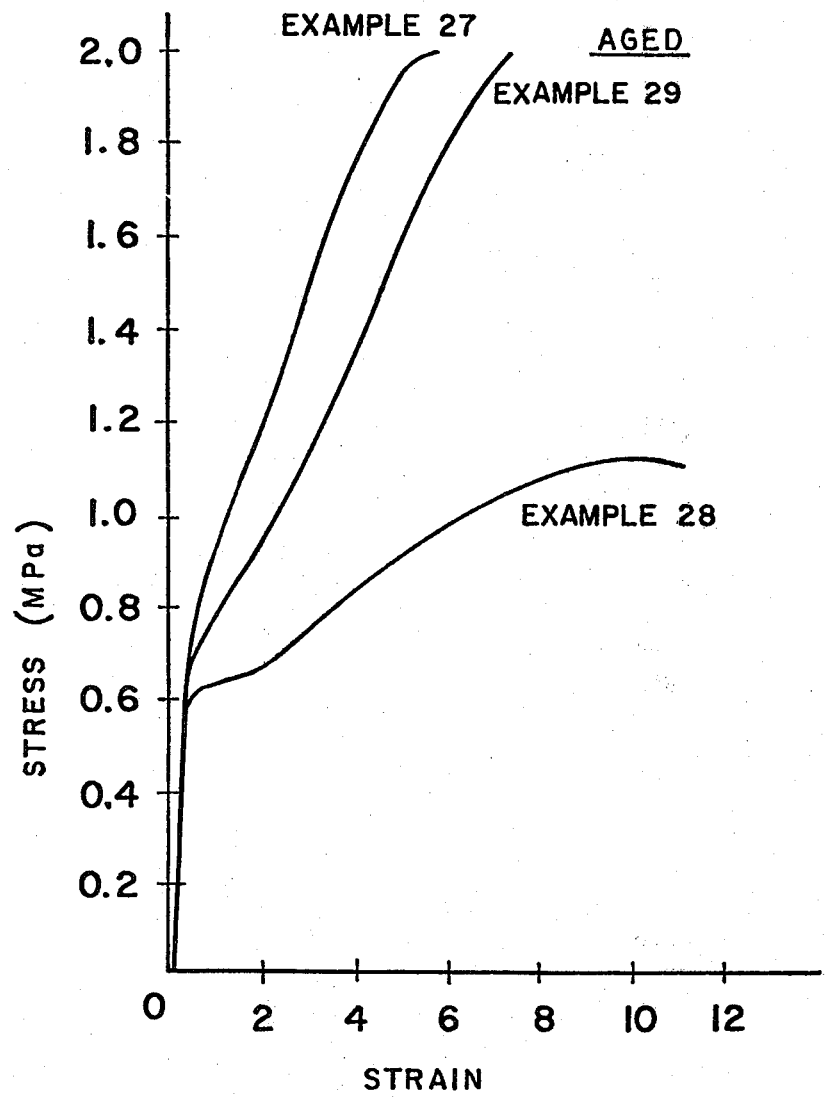

FIG. 4 depicts the effect of IBMA content on the green strength of a composition comprising 60% IBMA-SBR and 40% conventional SBR. As the IBMA content is increased, the strain hardening increases, however, there is an accompanying loss of elongation. In FIG. 5 the same compositions are again presented except that the latter have undergone several days of room temperature aging prior to testing.

Figure 6:
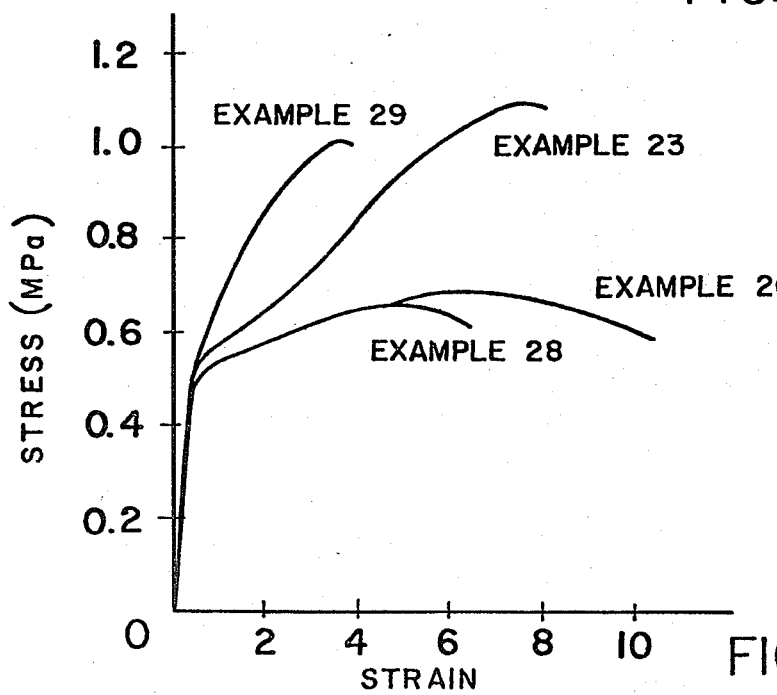

Lastly, FIG. 6 illustrates the effect on green strength that the type of salt employed to coagulate the IBMA-SBR copolymer has for two different amounts of IBMA content. The compositions tested were 60% IBMA copolymer and 40% conventional SBR and the salts utilized were CaCl$_2$ (Examples 28 and 29) and Ca(OH)$_2$ (Examples 23 and 26). It will be noted that the CaCl$_2$ coagulated samples showed less ultimate elongation as compared to the Ca(OH)$_2$ coagulated specimens. Nevertheless, both salts performed satisfactorily when the curves are compared to Example 20, FIG. 1 for the commercial SBR without the metal-modified IBMA-SBR copolymer of the present invention.

Figure 7:
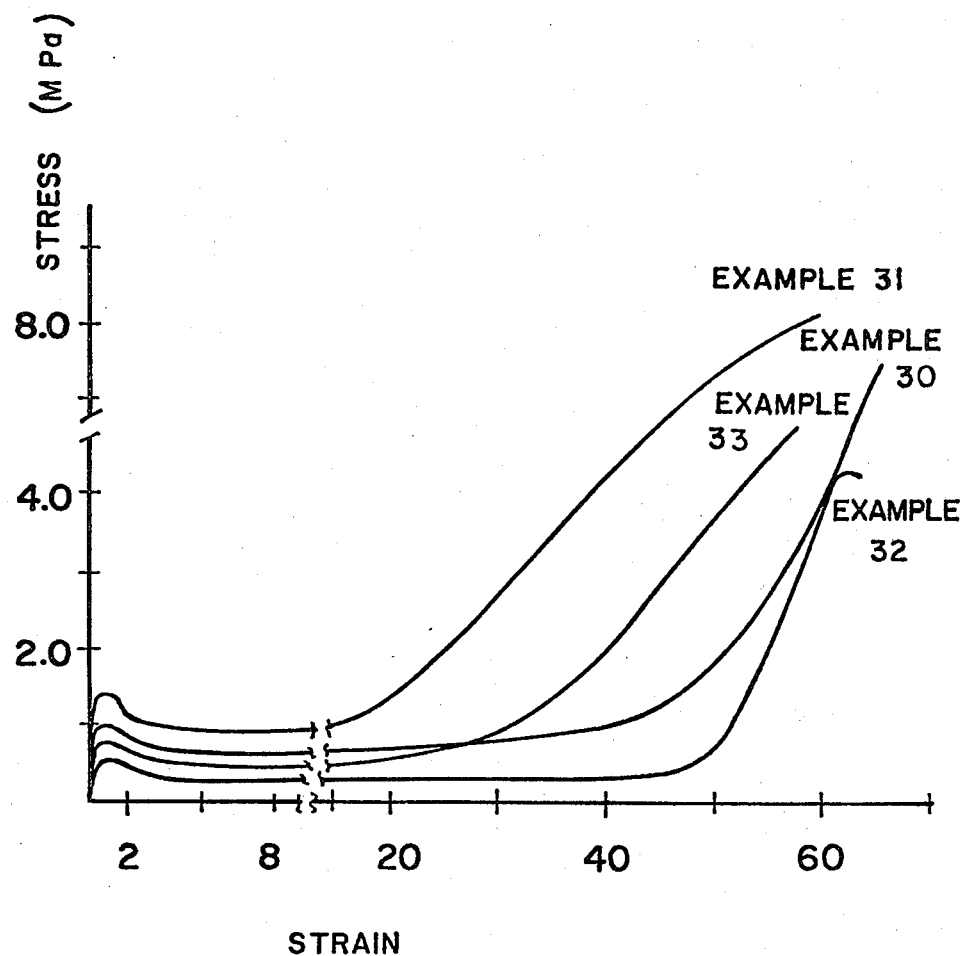
FIGS. 7 and 8 present additional stress-strain curves for copolymers of the present invention demonstrating the effect of cross-linking with metal ions in gum rubber and compounded stocks comprising SBR-IBMA polymers.
Figure 8:
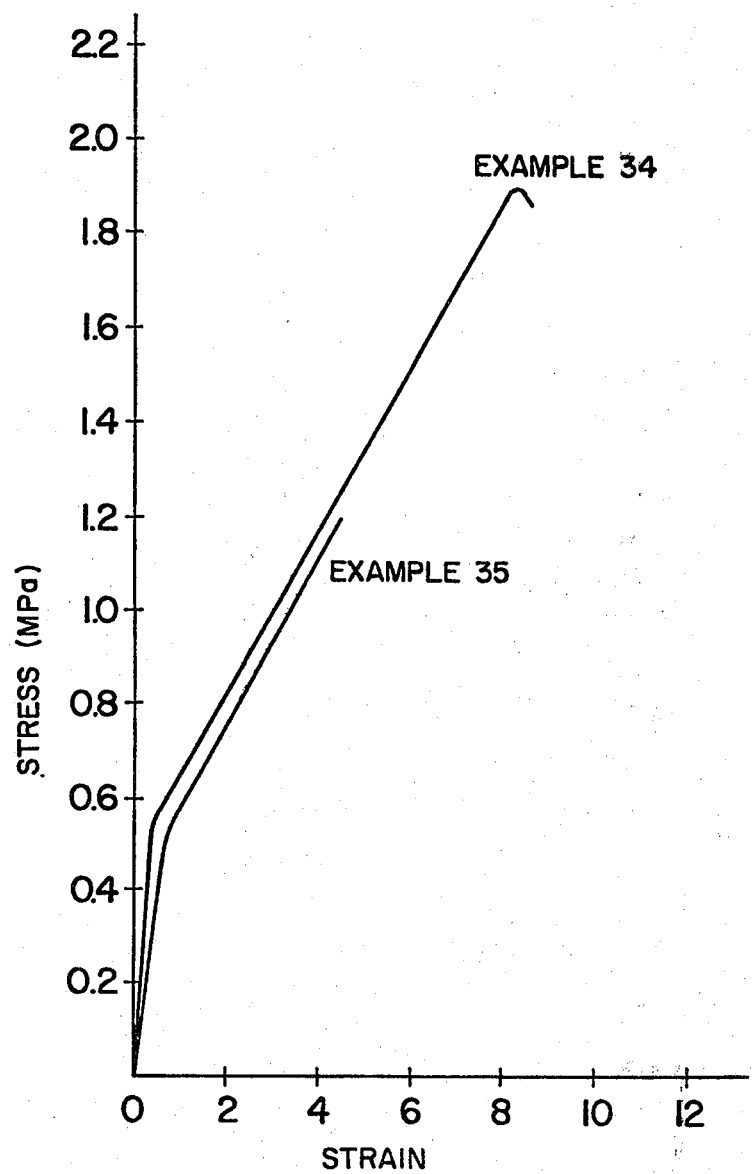

In order to demonstrate the effect that the presence of the metal ions imparts to the overall stress-strain properties of the IBMA-SBR polymer, reference should now be made to FIGS. 7 and 8. FIG. 7 presents two IBMA-SBR gum rubbers, Examples 30 and 31 containing 1.57 weight percent and 3.4 weight percent IBMA, respectively, each being cross-linked with calcium chloride according to the present invention. For comparison, the identical copolymers were prepared without coagulation with calcium chloride or any other metal salt and then tested. These products, Examples 32 and 33 containing 1.57 weight percent and 3.4 weight percent IBMA, respectively, each have lower peak stress and ultimate elongations than the respective polymers cross-linked with calcium ions. Initial modulus was higher for polymers cross-linked with calcium ions.

FIG. 8 compares an IBMA-SBR-metal salt copolymer of the present invention, Example 34, coagulated with calcium chloride and compounded with the ingredients used in conjunction with the examples reported in Table III, with an IBMA-SBR copolymer, Example 35, lacking any metal ion cross-linking. Initial modulus and ultimate elongation was again higher for the metal ion IBMA-SBR polymer, Example 34, than for Example 35.

From the foregoing analysis of the graphs depicted in FIGS. 1-8, it should be apparent that compounding IBMA-SBR copolymers of the present invention with a conventional SBR will improve the green strength of the latter. In order to obtain satisfactory green strength in an SBR such as the one selected for exemplification herein, the IBMA-SBR metal cross-linked copolymer of the present invention should comprise at least 50 percent by weight of the blend.

In addition to improving the green strength of commercial emulsion SBR's, the metal cross-linked IBMA-SBR copolymers of the present invention are also thermally reversible. To demonstrate this fact, several of the polymers were selected and were found to be insoluble in toluene at room temperature, showing gel-like behavior. When the toluene was heated to 80° C. for one hour, the gel-like polymer became soluble in the toluene. The solution was thereafter cooled to and maintained at room temperature for several days and the reformation of the gel-like polymer was observed.

The foregoing experiment demonstrated that the metal cross-linked polymers were thermally reversible. These polymers act identically to lightly cross-linked SBR at room temperature. Yet, at temperatures of 93° C. these polymers become soft and process very well. Then upon cooling, they become harder and regain their green strength. Softening upon heating is a highly desirable property in rubber compounding.

As stated hereinabove, the copolymers of the present invention can also comprise butadiene and IBMA, cross-linked with metal ions, without any vinyl monomer incorporated therein. To demonstrate, a copolymer was prepared utilizing the following recipe, all parts being in terms of parts per hundred monomer:

1. Water—200
2. potassium rosin soap—4
3. Nycol suspending agent—0.1
4. dodecyl mercaptan—0.026
5. diisopropylbenzene hydroperoxide—0.3
6. phosphoric acid—0.073
7. potassium hydroxide—0.06
8. ethylene diamine tetraacetic acid—0.07
9. IBMA—22
10. 1,3-butadiene—78
11. sodium formaldehyde sulfoxylate—0.04

12. FeSO4.7H2O—0.003

The procedure followed was to combine with the water, the emulsifiers (2 and 3), the initiator (4), modifier (5), buffering agents (6 and 7) and activator (8), followed by the addition of the monomers (9 and 10) and lastly the activators (11 and 12). Polymerization was conducted for about 15 hours at 5° C. and was thereafter terminated by the addition of sodium dimethyl-trithiolcarbamate. Conversion at this point was 55 percent. The latex product was then washed and filtered. An 800 ml quantity of the filtrate was thereafter coagulated with calcium chloride solution (10 g of the salt in 200 ml of water). Analysis of the polymer revealed an IBMA content of 11.21 weight percent and calcium content of 0.35 weight percent. The sample was tested and found to have a tensile strength at break of 0.98 MPa and 1300 percent elongation.

For purposes of comparison, a polybutadiene was prepared via emulsion polymerization according to the following recipe:
1. Water—300 ml
2. sodium lauryl sulfate—7.5 gms
3. butadiene—120.0 gms
4. diisopropylbenzene hydroperoxide—0.9 gms
5. tetraethylenepentamine—0.75 gms
6. n-dodecyl mercaptan 0.3 gms The polymerization was conducted for 16 hours at 5° C. for a conversion of 67 weight percent. Molded samples were prepared at a temperature of 100° C. for 5 minutes. Testing on an Instron was thereafter conducted with two specimens of the foregoing each having a width of 0.3 cm. One of the specimens exhibited a tensile strength of 0.34 MPa at 467% elongation and the other exhibited a tensile strength of 0.39 MPa at 500% elongation. It is readily seen that these values are considerably less than those reported herein for the copolymers of the present invention containing IBMA.

In conclusion, it is to be understood that the various examples reported herein have been provided to present results obtainable by practice of the disclosed invention. Inasmuch as we have disclosed various monomers that can be employed to prepare the N-(alkoxymethyl)acrylamide copolymers of this invention and various metal salts that can be employed to coagulate the polymer latexes, we do not intend to limit our invention to the specific copolymers exemplified herein. Furthermore, the process for preparing these acrylamide-metal copolymers is believed by us to be operable with monomers and metal salts other than those which have been exemplified herein.

Thus, it can be seen that the disclosed invention carries out the objects of the invention set forth hereinabove. As will be apparent to those skilled in the art, the green strength of a conventional SBR can be improved by adding to it one of the acrylamide-metal copolymers disclosed herein and it should be evident that the determination of particular monomers and metal salts, as well as the amounts thereof, can be made without departing from the spirit of the invention herein disclosed and described, and that the scope of the invention shall include all modifications and variations that fall within the scope of the attached claims.

We claim:

1. A process for improving the green strength of styrene-butadiene rubber comprising the step of:
    compounding with said styrene-butadiene rubber a thermally reversible copolymer comprising:
    from about 0.5 to about 11 percent by weight of an N-(alkoxymethyl)acrylamide;
    from about 10 to about 90 percent by weight of a diene compound;
    from about 0 to about 90 percent by weight of a monomer containing a vinyl group; and
    at least one equivalent mole of a metal ion to two equivalent moles of said N-(alkoxymethyl)acrylamide.

2. A process, as set forth in claim 1, wherein said N-(alkoxymethyl)acrylamide monomer has the formula

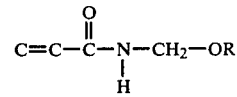

wherein R is selected from the group consisting of straight and branched alkyl chains having from one to about 20 carbon atoms and the amount thereof charged ranges from about 0.5 to about 11 percent by weight;
    said diene monomer has from about four to about 20 carbon atoms;
    said monomer containing a vinyl group is selected from the group consisting of monovinyl aromatic compounds having from eight to about 20 carbon atoms and vinyl compounds having from three to about five carbon atoms and a nitrile group; and
    said metal has the formula $MX_n$ wherein M is selected from the group of all di-, tri- and polyvalent metals; X is an anion selected from the group consisting of organic carboxylates, halides, hydroxide, nitrate, sulfate and sulfonates; and n is an integer from two to six.

3. A process as set forth in claim 1 wherein said styrene-butadiene rubber has a number average molecular weight of from about 5,000 to about 500,000; and
    wherein said thermally reversible polymer comprises at least 50 percent by weight of the compound formed with styrene-butadiene rubber.

* * * * *